(12) United States Patent
Sanghi

(10) Patent No.: US 12,393,556 B2
(45) Date of Patent: Aug. 19, 2025

(54) METHOD AND SYSTEM FOR PROVIDING DATABASE MANAGEMENT AS A SERVICE

(71) Applicant: JPMorgan Chase Bank, N.A., New York, NY (US)

(72) Inventor: Gaurav Sanghi, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 169 days.

(21) Appl. No.: 18/142,741

(22) Filed: May 3, 2023

(65) Prior Publication Data

US 2024/0370411 A1 Nov. 7, 2024

(51) Int. Cl.
*G06F 16/21* (2019.01)
*G06F 16/23* (2019.01)

(52) U.S. Cl.
CPC .......... *G06F 16/21* (2019.01); *G06F 16/2358* (2019.01)

(58) Field of Classification Search
None
See application file for complete search history.

(56) References Cited

U.S. PATENT DOCUMENTS

| 11,212,171 | B1* | 12/2021 | Ozkan | G06F 9/453 |
| 2018/0316552 | A1* | 11/2018 | Subramani Nadar | H04L 41/5045 |
| 2023/0273908 | A1* | 8/2023 | Souza Vaz | G06F 11/004 707/609 |

* cited by examiner

*Primary Examiner* — Scott A. Waldron
(74) *Attorney, Agent, or Firm* — Greenblum & Bernstein, P.L.C.

(57) ABSTRACT

A method for providing database management as a service is disclosed. The method includes onboarding applications to access a corresponding configuration file; parsing the configuration file to identify constraints that govern a database activity for each of the applications and a database that correspond to each of the applications; identifying database procedures based on the constraints; configuring parameters of the database based on the constraints, the parameters corresponding to the database activity; and automatically initiating, by using the identified database procedures, the database activity for each of the applications based on the configured corresponding parameters.

20 Claims, 5 Drawing Sheets

METHOD AND SYSTEM FOR PROVIDING DATABASE MANAGEMENT AS A SERVICE

BACKGROUND

1. Field of the Disclosure

This technology generally relates to methods and systems for database management, and more particularly to methods and systems for providing database management as a service by using a metadata driven framework to enable direct administration of database related activities for database objects by corresponding development teams.

2. Background Information

Many business entities rely on numerous software applications to facilitate day-to-day operations and provide services for users. Often, these software applications are implemented by using database objects that are maintained in externally controlled databases. Historically, implementations of conventional management techniques for these databases have resulted in varying degrees of success with respect to dependency, visibility, and control of the software applications by corresponding development teams.

One drawback of using the conventional database management techniques is that in many instances, database related activities such as, for example, database maintenance activities are managed independently of the database objects. As a result, software applications that depend on the database objects may encounter production job failures when unanticipated database activities are unexpectedly initiated. Additionally, the database related activities are generally scheduled for a set time and independently initiated without logging and/or failure tracking because functionalities, usages, and operational windows are not shared between different management processes in the conventional database management techniques.

Therefore, there is a need for a metadata driven framework that provides database management as a service to enable direct administration of database related activities for database objects by corresponding development teams.

SUMMARY

The present disclosure, through one or more of its various aspects, embodiments, and/or specific features or sub-components, provides, inter alia, various systems, servers, devices, methods, media, programs, and platforms for providing database management as a service by using a metadata driven framework to enable direct administration of database related activities for database objects by corresponding development teams.

According to an aspect of the present disclosure, a method for providing database management as a service is disclosed. The method is implemented by at least one processor. The method may include onboarding at least one application to access a corresponding configuration file; parsing the configuration file to identify at least one constraint that governs a database activity for the at least one application and a database that corresponds to the at least one application; identifying at least one database procedure based on the at least one constraint; configuring at least one parameter of the database based on the at least one constraint, the at least one parameter may correspond to the database activity; and automatically initiating, by using the identified at least one database procedure, the database activity for the at least one application based on the configured at least one parameter.

In accordance with an exemplary embodiment, the method may further include tracking at least one action that corresponds to the automatically initiated database activity; logging at least one change that is associated with each of the at least one action; and automatically generating at least one report for the at least one application, the at least one report may include information that relates to at least one from among the database activity, the at least one action, the at least one change, and an activity completion status.

In accordance with an exemplary embodiment, the method may further include monitoring at least one health characteristic of the database when the database activity is automatically initiated; automatically determining a condition of the database based on a result of the monitoring, the condition may include at least one from among an error condition and a change condition; and generating at least one notification for a user associated with the at least one application, the at least one notification may include information that relates to at least one from among the at least one health characteristic, the database, the database activity, and the determined condition.

In accordance with an exemplary embodiment, the error condition may include at least one from among a failed condition that relates to a malfunction in a maintenance task and an uncompleted condition that relates to an incompletion of the maintenance task due to an insufficient time window.

In accordance with an exemplary embodiment, the method may further include automatically determining at least one resolution action for the database activity when the error condition is determined; identifying a database activity schedule for the database, the database activity schedule may relate to an initiation of at least one subsequent database activity; and automatically scheduling execution of the at least one resolution action based on the database activity schedule and the at least one parameter.

In accordance with an exemplary embodiment, the method may further include aggregating, when the error condition is determined, data that corresponds to the error condition and the database activity; automatically generating a ticket in a workflow management system by using the aggregated data; and alerting the user that is associated with the at least one application, the alert may include information that relates to at least one from among the error condition, the database activity, and the generated ticket.

In accordance with an exemplary embodiment, the configuration file may include at least one instruction and a corresponding time window for the database activity, the database activity may include at least one maintenance activity for at least one database object that is associated with the at least one application.

In accordance with an exemplary embodiment, the method may further include receiving, via a graphical user interface, at least one new constraint that governs the database activity for the at least one application; and automatically updating the configured at least one parameter of the database based on the at least one new constraint.

In accordance with an exemplary embodiment, the at least one database procedure may include at least one persistent section that corresponds to each of the configured at least one parameter.

According to an aspect of the present disclosure, a computing device configured to implement an execution of a method for providing database management as a service is disclosed. The computing device including a processor; a memory; and a communication interface coupled to each of the processor and the memory, the processor may be configured to onboard at least one application to access a corresponding configuration file; parse the configuration file to identify at least one constraint that governs a database activity for the at least one application and a database that corresponds to the at least one application; identify at least one database procedure based on the at least one constraint; configure at least one parameter of the database based on the at least one constraint, the at least one parameter may correspond to the database activity; and automatically initiate, by using the identified at least one database procedure, the database activity for the at least one application based on the configured at least one parameter.

In accordance with an exemplary embodiment, the processor may be further configured to track at least one action that corresponds to the automatically initiated database activity; log at least one change that is associated with each of the at least one action; and automatically generate at least one report for the at least one application, the at least one report may include information that relates to at least one from among the database activity, the at least one action, the at least one change, and an activity completion status.

In accordance with an exemplary embodiment, the processor may be further configured to monitor at least one health characteristic of the database when the database activity is automatically initiated; automatically determine a condition of the database based on a result of the monitoring, the condition may include at least one from among an error condition and a change condition; and generate at least one notification for a user associated with the at least one application, the at least one notification may include information that relates to at least one from among the at least one health characteristic, the database, the database activity, and the determined condition.

In accordance with an exemplary embodiment, the error condition may include at least one from among a failed condition that relates to a malfunction in a maintenance task and an uncompleted condition that relates to an incompletion of the maintenance task due to an insufficient time window.

In accordance with an exemplary embodiment, the processor may be further configured to automatically determine at least one resolution action for the database activity when the error condition is determined; identify a database activity schedule for the database, the database activity schedule may relate to an initiation of at least one subsequent database activity; and automatically schedule execution of the at least one resolution action based on the database activity schedule and the at least one parameter.

In accordance with an exemplary embodiment, the processor may be further configured to aggregate, when the error condition is determined, data that corresponds to the error condition and the database activity; automatically generate a ticket in a workflow management system by using the aggregated data; and alert the user that is associated with the at least one application, the alert may include information that relates to at least one from among the error condition, the database activity, and the generated ticket.

In accordance with an exemplary embodiment, the configuration file may include at least one instruction and a corresponding time window for the database activity, the database activity may include at least one maintenance activity for at least one database object that is associated with the at least one application.

In accordance with an exemplary embodiment, the processor may be further configured to receive, via a graphical user interface, at least one new constraint that governs the database activity for the at least one application; and automatically update the configured at least one parameter of the database based on the at least one new constraint.

In accordance with an exemplary embodiment, the at least one database procedure may include at least one persistent section that corresponds to each of the configured at least one parameter.

According to an aspect of the present disclosure, a non-transitory computer readable storage medium storing instructions for providing database management as a service is disclosed. The storage medium including executable code which, when executed by a processor, may cause the processor to onboard at least one application to access a corresponding configuration file; parse the configuration file to identify at least one constraint that governs a database activity for the at least one application and a database that corresponds to the at least one application; identify at least one database procedure based on the at least one constraint; configure at least one parameter of the database based on the at least one constraint, the at least one parameter may correspond to the database activity; and automatically initiate, by using the identified at least one database procedure, the database activity for the at least one application based on the configured at least one parameter.

In accordance with an exemplary embodiment, when executed by the processor, the executable code may further cause the processor to track at least one action that corresponds to the automatically initiated database activity; log at least one change that is associated with each of the at least one action; and automatically generate at least one report for the at least one application, the at least one report may include information that relates to at least one from among the database activity, the at least one action, the at least one change, and an activity completion status.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
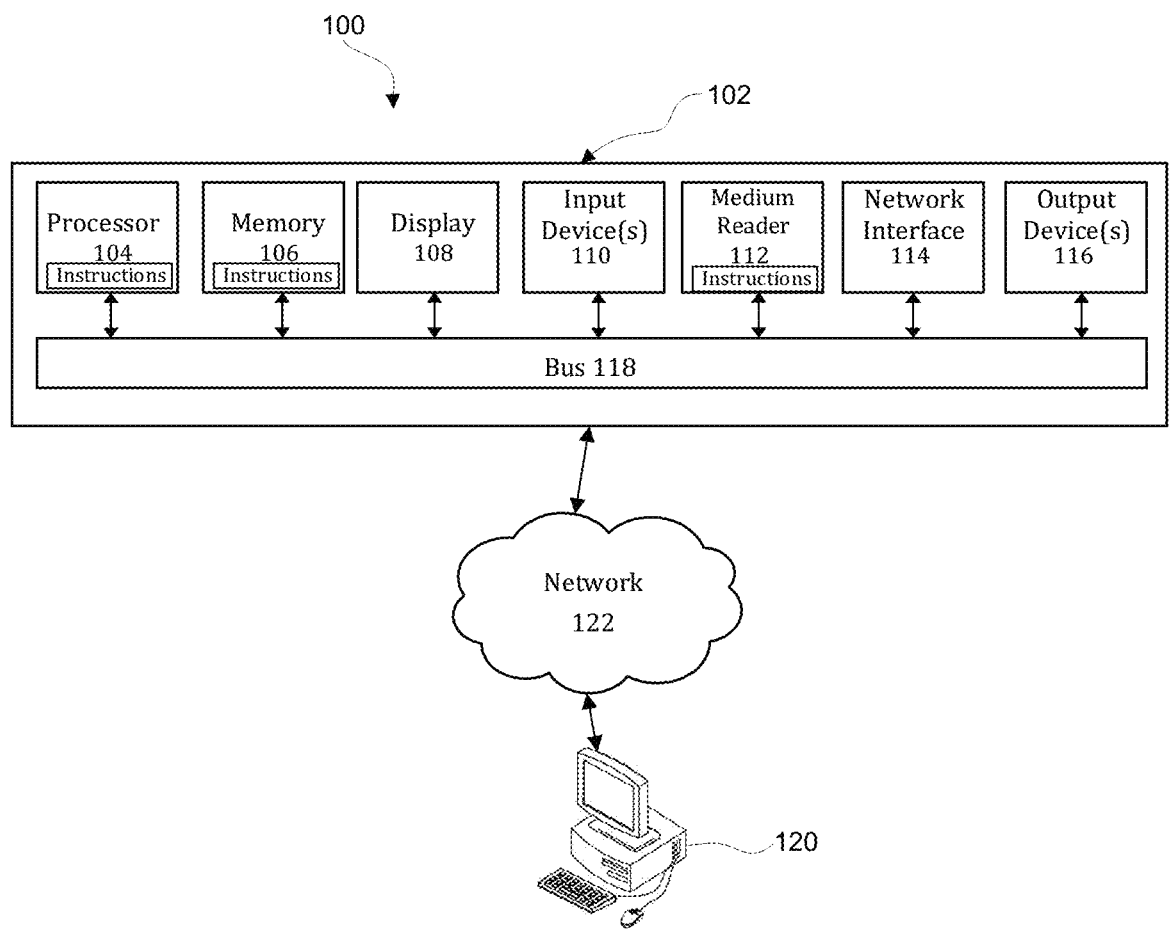
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth®, Zigbee®, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing database management as a service by using a metadata driven framework to enable direct administration of database related activities for database objects by corresponding development teams.

Figure 2:
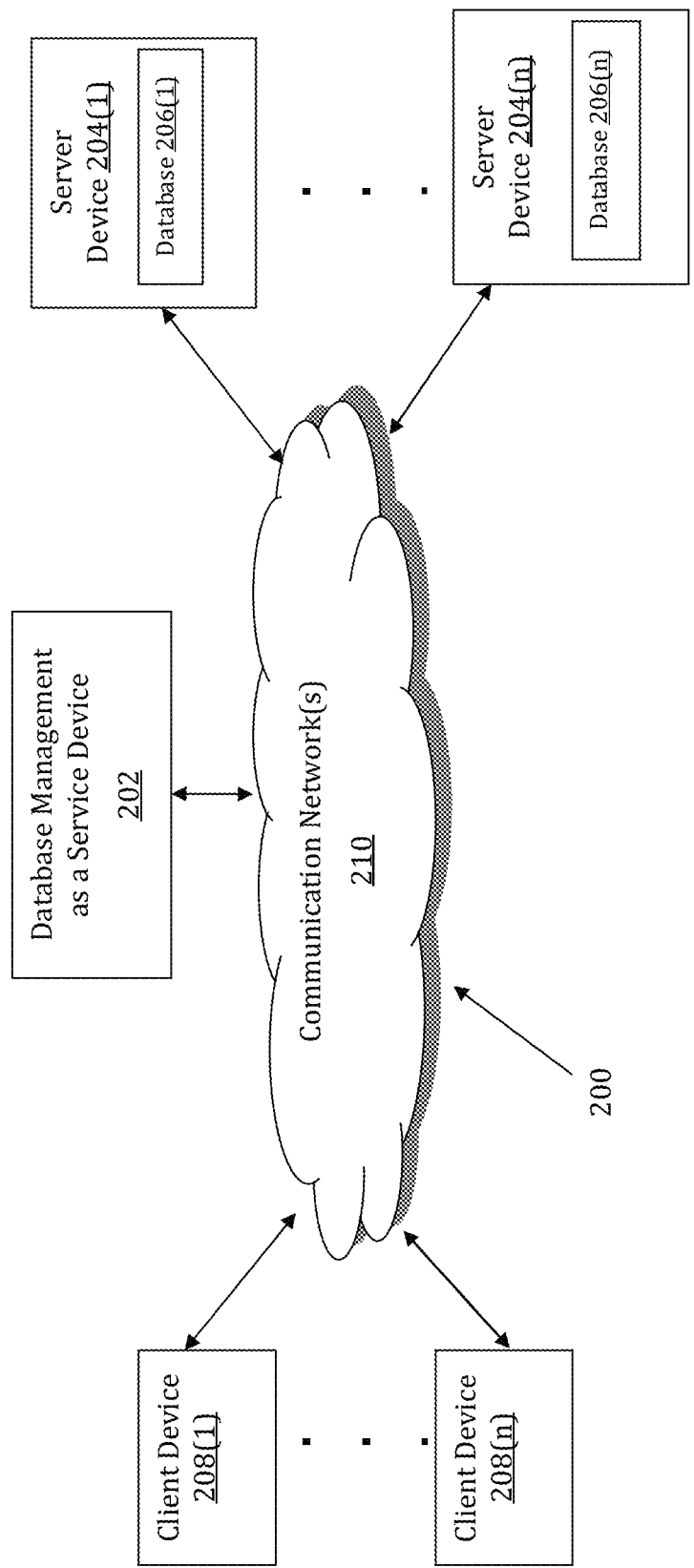
FIG. 2 illustrates an exemplary diagram of a network environment.

Referring to FIG. 2, a schematic of an exemplary network environment 200 for implementing a method for providing database management as a service by using a metadata driven framework to enable direct administration of database related activities for database objects by corresponding development teams is illustrated. In an exemplary embodiment, the method is executable on any networked computer platform, such as, for example, a personal computer (PC).

The method for providing database management as a service by using a metadata driven framework to enable direct administration of database related activities for database objects by corresponding development teams may be implemented by a Database Management as a Service (DbMaaS) device 202. The DbMaaS device 202 may be the same or similar to the computer system 102 as described with respect to FIG. 1. The DbMaaS device 202 may store one or more applications that can include executable instructions that, when executed by the DbMaaS device 202, cause the DbMaaS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DbMaaS device 202 itself, may be located in virtual server(s) running in a cloud-based computing environment rather than being tied to one or more specific physical network computing devices. Also, the application(s) may be running in one or more virtual machines (VMs) executing on the DbMaaS device 202. Additionally, in one or more embodiments of this technology, virtual machine(s) running on the DbMaaS device 202 may be managed or supervised by a hypervisor.

In the network environment 200 of FIG. 2, the DbMaaS device 202 is coupled to a plurality of server devices 204(1)-204(n) that hosts a plurality of databases 206(1)-206(n), and also to a plurality of client devices 208(1)-208(n) via communication network(s) 210. A communication interface of the DbMaaS device 202, such as the network interface 114 of the computer system 102 of FIG. 1, operatively couples and communicates between the DbMaaS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DbMaaS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DbMaaS devices that efficiently implement a method for providing database management as a service by using a metadata driven framework to enable direct administration of database related activities for database objects by corresponding development teams.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DbMaaS device 202 may be a standalone device or integrated with one or more other devices or apparatuses, such as one or more of the server devices 204(1)-204(n), for example. In one particular example, the DbMaaS device 202 may include or be hosted by one of the server devices 204(1)-204(n), and other arrangements are also possible. Moreover, one or more of the devices of the DbMaaS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DbMaaS device 202 via the communication network(s) 210 according to the HTTP-based and/or JavaScript® Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to applications, configuration files, constraints, database activities, database procedures, database parameters, maintenance stored procedures, configuration/metadata tables, audit/log tables, and reports.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DbMaaS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DbMaaS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DbMaaS device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DbMaaS device 202, the server devices 204(1)-204(n), or the client devices 208(1)-208(n), for example, may be configured to operate as virtual instances on the same physical machine. In other words, one or more of the DbMaaS device 202, the server devices 204(1)-204(n), or the client devices 208(1)-208(n) may operate on the same physical device rather than as separate devices communicating through communication network(s) 210. Additionally, there may be more or fewer DbMaaS devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
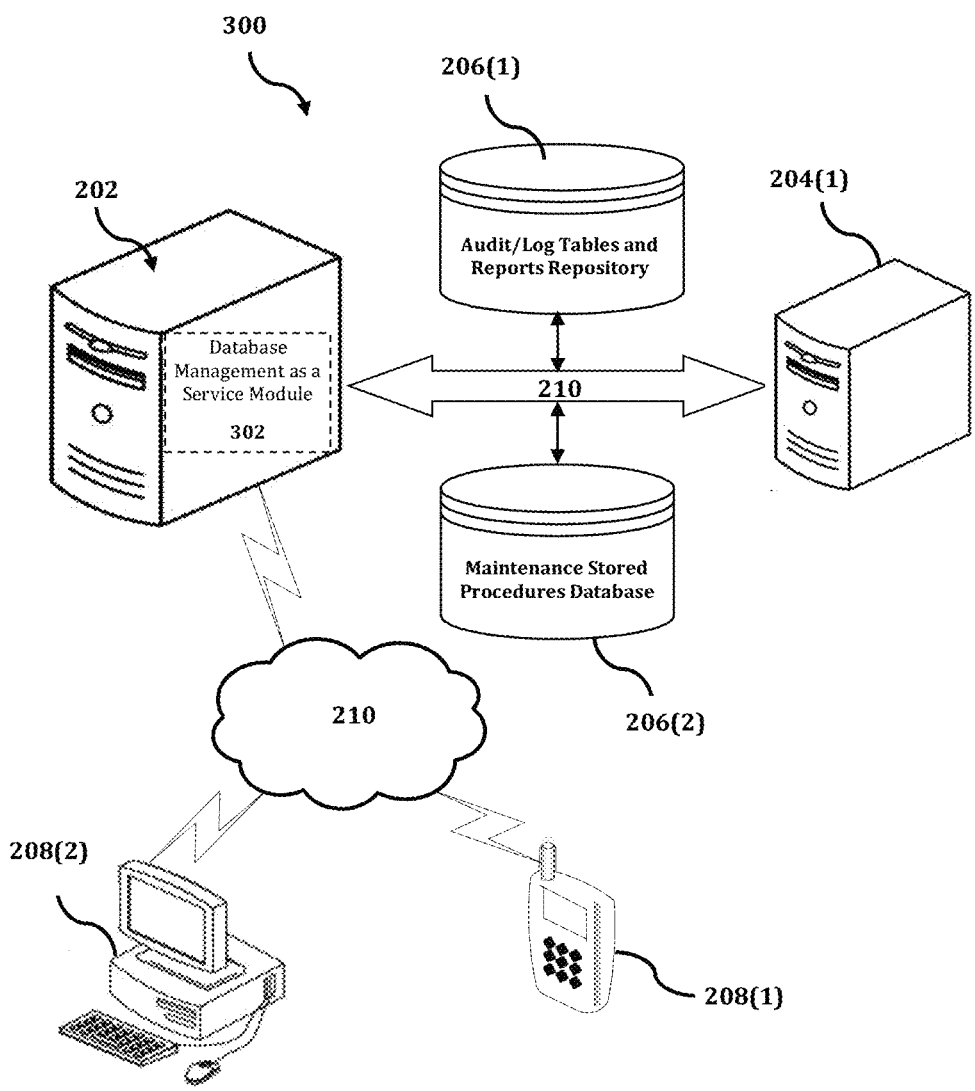
FIG. 3 shows an exemplary system for implementing a method for providing database management as a service by using a metadata driven framework to enable direct administration of database related activities for database objects by corresponding development teams.

The DbMaaS device 202 is described and shown in FIG. 3 as including a database management as a service module 302, although it may include other rules, policies, modules, databases, or applications, for example. As will be described below, the database management as a service module 302 is configured to implement a method for providing database management as a service by using a metadata driven framework to enable direct administration of database related activities for database objects by corresponding development teams.

An exemplary process 300 for implementing a mechanism for providing database management as a service by using a metadata driven framework to enable direct administration of database related activities for database objects by corresponding development teams by utilizing the network environment of FIG. 2 is shown as being executed in FIG. 3. Specifically, a first client device 208(1) and a second client device 208(2) are illustrated as being in communication with DbMaaS device 202. In this regard, the first client device 208(1) and the second client device 208(2) may be "clients" of the DbMaaS device 202 and are described herein as such. Nevertheless, it is to be known and understood that the first client device 208(1) and/or the second client device 208(2) need not necessarily be "clients" of the DbMaaS device 202, or any entity described in association therewith herein. Any additional or alternative relationship may exist between either or both of the first client device 208(1) and the second client device 208(2) and the DbMaaS device 202, or no relationship may exist.

Further, DbMaaS device 202 is illustrated as being able to access an audit/log tables and reports repository 206(1) and a maintenance stored procedures database 206(2). The database management as a service module 302 may be configured to access these databases for implementing a method for providing database management as a service by using a metadata driven framework to enable direct administration of database related activities for database objects by corresponding development teams.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DbMaaS device 202 via broadband or cellular communication. Of course, these embodiments are merely exemplary and are not limiting or exhaustive.

Upon being started, the database management as a service module 302 executes a process for providing database management as a service by using a metadata driven framework to enable direct administration of database related activities for database objects by corresponding development teams. An exemplary process for providing database management as a service by using a metadata driven framework to enable direct administration of database related activities for database objects by corresponding development teams is generally indicated at flowchart 400 in FIG. 4.

Figure 4:
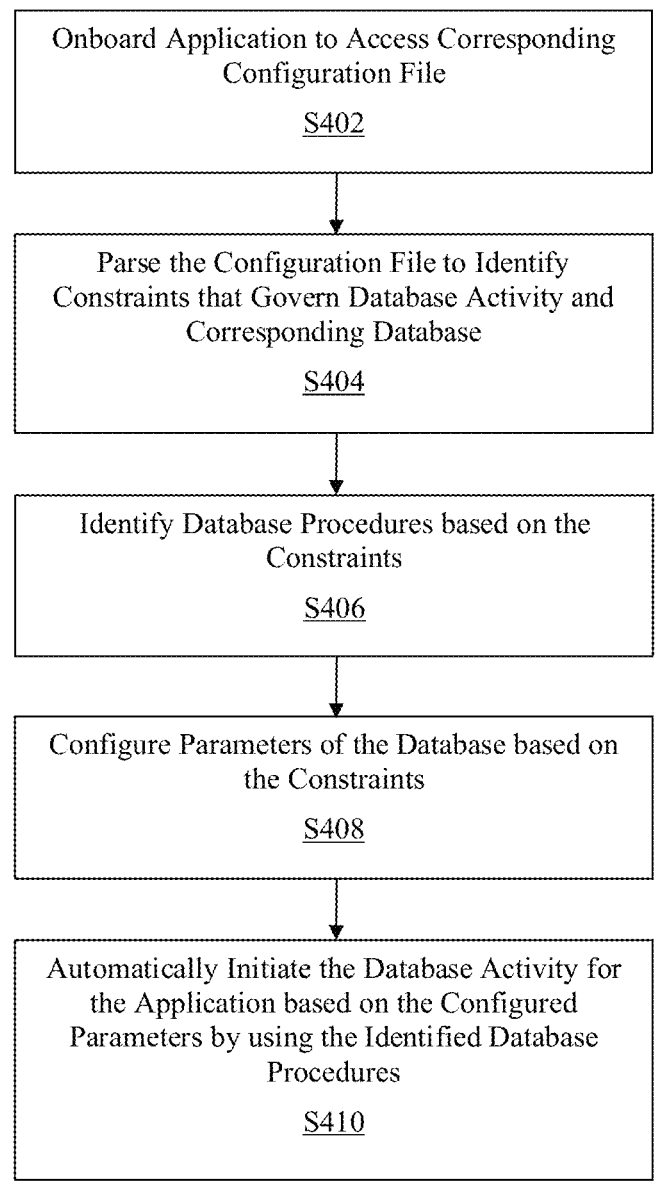
FIG. 4 is a flowchart of an exemplary process for implementing a method for providing database management as a service by using a metadata driven framework to enable direct administration of database related activities for database objects by corresponding development teams.

In the process 400 of FIG. 4, at step S402, an application may be onboarded to access a corresponding configuration file. The application may be onboarded individually or together with other applications in any combination. In an exemplary embodiment, the application may be onboarded via a graphical user interface. A user such as, for example, a developer who is associated with the application may interact with the graphical user interface to provide information such as, for example, the configuration file that corresponds to the application to facilitate the onboarding process.

In another exemplary embodiment, the graphical user interface may correspond to an interface that facilitates interactions between a user and computing components. The graphical user interface may include graphical icons and audio indicators. In another exemplary embodiment, the graphical user interface may relate to a system of interactive visual components for computer software. The graphical user interface may display graphical objects that convey information and represent actions that can be taken by the user. For example, the user may interact with the displayed graphical objects to input information that corresponds to the application. In another exemplary embodiment, the displayed graphical objects may automatically change based on the user inputs. For example, an input A by the user may cause information B and/or input field C to be displayed for the user.

In another exemplary embodiment, the onboarding may relate to an incorporation process that facilitates integration of the application with the claimed invention. The users may be required to provide necessary application information such as, for example, an application identifier as well as perform necessary actions such as, for example, uploading the configuration file.

In another exemplary embodiment, the configuration file may include data that dictates what database activities may be performed for database objects associated with the application and when. For example, the configuration file may include data that dictates that database maintenance activities may only be performed during periods of low application activity. The data may specify the specific database activities as well as a corresponding time for initiation of the database activities.

In another exemplary embodiment, the configuration file may include preference data for the user. The preference data may dictate a user desired setting for the disclosed invention. For example, the configuration file may include a predetermined notification preference of the user that relates to where the notification should be sent and how often. In another exemplary embodiment, the configuration file may include identifying information for the application and corresponding database objects. For example, the configuration file may include an application identifier that is usable to locate the corresponding database objects in a database.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the configuration file may be parsed to identify constraints and a database that correspond to the application. The constraints may govern a database activity for the application. In an exemplary embodiment, the constraints may dictate what database activities may be performed for database objects associated with the application and when. For example, the constraints may dictate that database maintenance activities may only be performed during periods of low application activity.

In another exemplary embodiment, the configuration file may include identifying information for the application and corresponding database objects. For example, the configuration file may include an application identifier that is usable to locate the corresponding database objects in the database. In another exemplary embodiment, the configuration file may include instructions and a corresponding time window for the database activity. The database activity may include a maintenance activity for database objects that are associated with the application.

In another exemplary embodiment, the database activities may include database maintenance activities, database documentation activities, and database monitoring activities. The database maintenance activities may include at least one from among a data purging activity, a data archival activity, a partition maintenance activity, an index maintenance activity, and a partition/index compression activity. The database documentation activities may include at least one from among a gathering database statistics activity, an auditing activity, and a reporting activity. The database monitoring activities may include a health monitoring activity.

At step S406, database procedures may be identified based on the constraints. That is, the appropriate database procedures necessary for the required tasks may be identified based on the constraints from the configuration file. In an exemplary embodiment, the database procedures may be persistent and stay in memory after execution is completed. The database procedures may include persistent sections that correspond to configured parameters. The database procedures may relate to subroutines that can contain one or more statements that perform a specific task such as, for example, facilitating automated initiation of the database activity based on corresponding configured parameters. In another exemplary embodiment, the persistent database procedure may include all sections that are usable to support any available configurations and/or parameters. Appropriate sections of the database procedures, which have been identified based on the constraints, may be executed to facilitate automated initiation of the database activity in accordance with the configured parameters.

At step S408, parameters of the database may be configured based on the constraints. The parameters may correspond to the database activity. In an exemplary embodiment, the configured parameters may define properties of the database activity. The configured parameters may set the conditions for operation of the database activity. For example, the configured parameters may dictate a time window for the execution of the database activity in the database.

At step S410, the database activity for the application may be automatically initiated by using the identified database procedures. The database activity may be automatically initiated based on the configured parameters. In an exemplary embodiment, automatically initiating the database activity based on the configured parameters may enable direct control of database maintenance activities at a database object level to ensure that the database maintenance activities are performed in an optimal time window for the application. The automatic initiation of the database activity may be enabled and disabled at any time based on a user preference. For example, the user may interact with the graphical user interface to enable or disable the next upcoming database activity that has been scheduled for automatic initiation.

In another exemplary embodiment, actions that correspond to the automatically initiated database activity may be tracked. For example, when the database activity relates to a data purging maintenance activity, deletion actions to remove data elements may be tracked. The actions may be collectively tracked based on a similar characteristic such as, for example, a deletion characteristic as well as individually tracked for each of the actions.

Additionally, changes that are associated with each of the actions may be logged. For example, when the database activity relates to a data purging maintenance activity, changes resulting from the removal of the data elements may be logged. The changes may be logged for each collection of removed data elements as well as for each of the removed data elements. Then, reports for the application may be automatically generated. The reports may be automatically generated based on the tracked actions and the logged changes. The reports may include information that relates to at least one from among the database activity, the corresponding action, the corresponding change, and an activity completion status for the database activity.

In another exemplary embodiment, health characteristics of the database may be monitored when the database activity is automatically initiated. A condition of the database may be automatically determined based on a result of the monitoring. The condition may include at least one from among an error condition and a change condition. For example, the error condition may relate to identification of invalid and/or obsolete data objects in the database. Likewise, the change condition may relate to identification of new data objects in the database.

Then, notifications may be generated for a user such as, for example, a developer who is associated with the application. The notifications may include information that relates to at least one from among the health characteristic, the database, the database activity, and the determined condition. Consistent with present disclosures, the user may be associated with the application during an initial configuration process such as, for example, the onboarding process.

In another exemplary embodiment, the error condition may include at least one from among a failed condition and an uncompleted condition. The failed condition may relate to a malfunction in a maintenance task. The uncompleted condition may relate to an incompletion of the maintenance task due to an insufficient time window. In another exemplary embodiment, the error condition may relate to a state of various elements such as, for example, a state of indexes in the database. For example, the indexes may be determined to be invalid, unusable, and/or invisible. Similarly, the state of tables in the database may indicate that there are database tables with more than twenty-five percent empty data blocks.

In another exemplary embodiment, resolution actions for the database activity may be automatically determined. The resolution actions may be automatically determined when the error condition is determined. For example, the resolution actions may include an automated catch-up action for any pending maintenance tasks due to prior failure or lack of time in the maintenance time window.

Then, database activity schedules for the database may be identified. The database activity schedules may relate to an initiation of subsequent database activities. For example, a database activity schedule that includes scheduled initiation times for a plurality of subsequent database activities in the database may be identified. Thus, execution of the resolution actions may be automatically scheduled based on the identified database activity schedules and the configured database parameters. Consistent with present disclosures, execution of the resolution actions may be automatically scheduled in view of the identified database activity schedules and in accordance with the configured database parameters to ensure that the resolution actions do not conflict with the subsequent database activities while still adhering to the configured database parameters.

In another exemplary embodiment, data that corresponds to the error condition and the database activity may be aggregated. Consistent with present disclosures, the data may be aggregated when the error condition is determined to facilitate exception handling. A ticket in a workflow management system may be automatically generated by using the aggregated data. The ticket may relate to a request for services such as, for example, resolution services for the determined error condition. The ticket may correspond to a record in the workflow management system of work performed, or needing to be performed, by a user such as, for example, a developer of the application to fix issues related to the determined error condition. Then, the user that is associated with the application may be alerted. The alert may include information that relates to at least one from among the error condition, the database activity, and the generated ticket.

In another exemplary embodiment, new constraints that govern the database activity for the applications may be received via a graphical user interface. The new constraints may be received directly from the user associated with the application via the graphical user interface. For example, the user may interact with the graphical user interface to directly provide the new constraints for an application.

Alternatively, the new constraints may be indirectly received from the user associated with the application. For example, the user may interact with the graphical user interface to provide an updated configuration file for the application. Consistent with present disclosures, the updated configuration file may be parsed to identify the new constraints for the application. Then, the configured parameters of the database may be automatically updated based on the new constraints. As such, changes and/or additions to the configured parameters of the database may be simply and quickly completed with minimal development changes.

Figure 5:
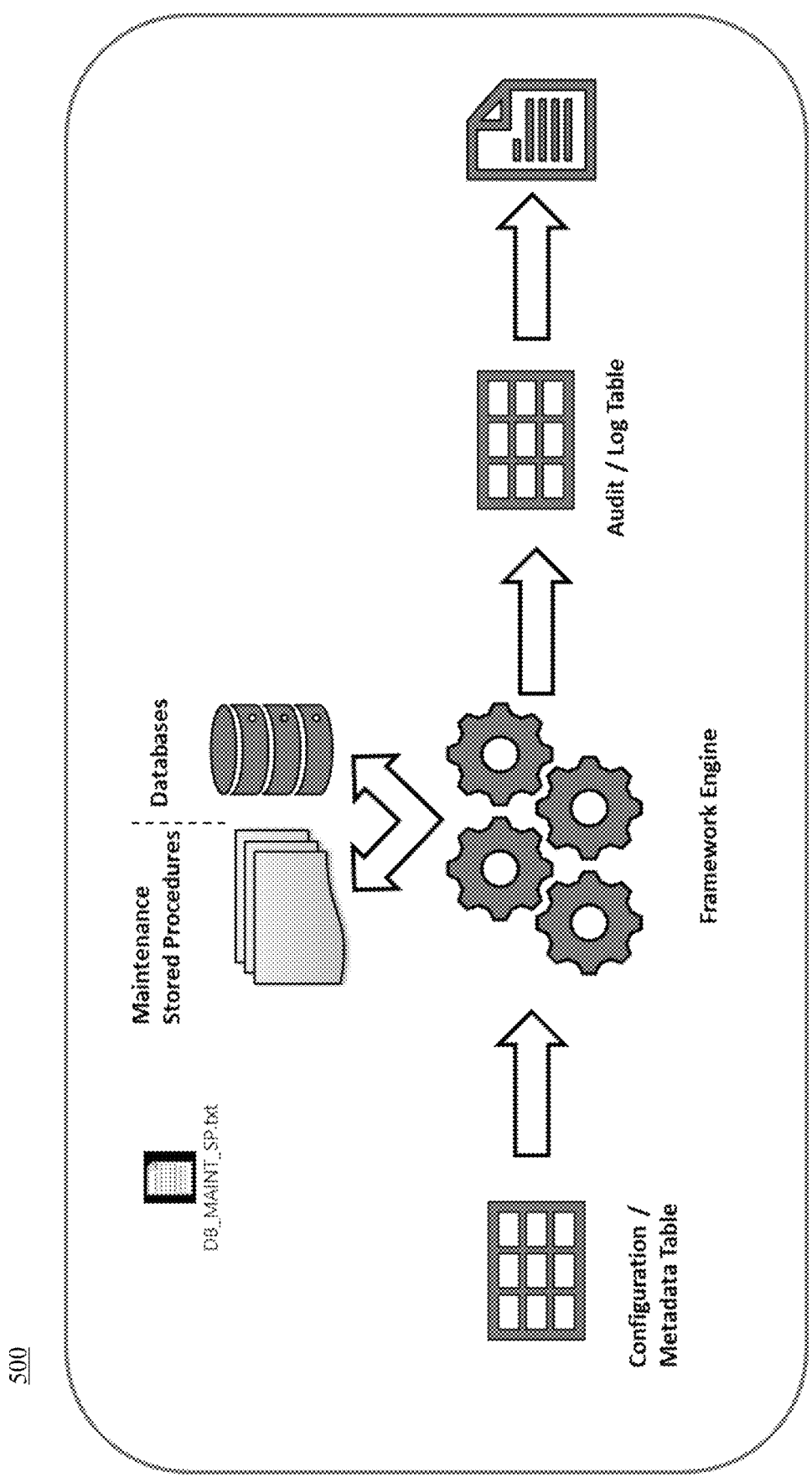
FIG. 5 is an architecture diagram of an exemplary process for implementing a method for providing database management as a service by using a metadata driven framework to enable direct administration of database related activities for database objects by corresponding development teams.

FIG. 5 is an architecture diagram 500 of an exemplary process for implementing a method for providing database management as a service by using a metadata driven framework to enable direct administration of database related activities for database objects by corresponding development teams. In FIG. 5, database management as a service may be implemented by using a metadata driven framework which allows application development teams to decide when and what database activities may be done for each database object of an application.

The metadata driven framework may allow performance of different actions on the same database objects at different times based on how the database objects are used during different times of the day. For example, performance of the different actions may be allowed for the database objects during safe periods to avoid production failures and reduce risks associated with missing service level agreements (SLAs) for clients. Similarly, when there is a busy period, no actions and/or database activities may be allowed during this time window. Consistent with present disclosures, the metadata driven framework may monitor the database and track the various database activities to provide a complete audit trail on every action performed. This may help greatly during application audits and compliance review.

As illustrated in FIG. 5, the metadata driven framework may include a framework engine that is configured to receive configuration files and/or metadata tables. The configuration files and/or the metadata tables may be received from developers associated with an application. Consistent with present disclosures, the configuration files and/or the metadata tables may be received during the onboarding process for the application.

Then, the framework engine may set maintenance parameters for a database that is associated with the application based on the configuration files and/or the metadata tables. The maintenance parameters may be persisted as maintenance stored procedures for the database. The framework engine may perform various database services such as, for example, maintenance activities for the database based on the set maintenance parameters.

Consistent with present disclosures, the framework engine may generate audit and/or log tables that document actions taken by the framework engine as well as record changes made to the database. The generated audit and/or log tables may include information that is usable to generate reports for the application. The reports may be automatically generated to include a status of the actions taken by the framework engine. For example, the reports may be automatically generated based on a predetermined schedule to include a maintenance status for the application. Alternatively, the reports may be generated in an ad-hoc manner based on user preference. For example, users may interact with a graphical user interface to request an ad-hoc generation of a report to view a current maintenance status for the application.

Accordingly, with this technology, an optimized process for providing database management as a service by using a metadata driven framework to enable direct administration of database related activities for database objects by corresponding development teams is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing database management as a service, the method being implemented by at least one processor, the method comprising:

implementing, by the at least one processor, a metadata driven framework engine to perform operations comprising:

onboarding at least one application to access a corresponding configuration file and a metadata table;

parsing the configuration file and the metadata table to identify at least one constraint that governs a database activity for the at least one application and a database that corresponds to the at least one application;

identifying at least one database procedure based on the at least one constraint;

configuring at least one parameter of the database based on the at least one constraint, the at least one parameter defining at least one property of the database activity;

automatically initiating, using the identified at least one database procedure, a direct control of the database activity for the at least one application based on the configured at least one parameter;

monitoring at least one health characteristic of the database when the database activity is automatically initiated;

automatically determining a condition of the database based on a result of the monitoring, the condition including an error condition comprising an identification of an obsolete data object in the database;

minimizing a production failure and a risk associated with a missing service level agreement by performing at least one different action at an optimal time window to perform at least one maintenance activity on the metadata driven framework engine, wherein the performing at least one different action is associated with the database activity that corresponds to the at least one maintenance activity and includes the performing at least one different action on same database objects based on a usage of a database object at different time periods;

generating a report comprising at least one from among an audit and a log table recording a status of the performing at least one different action in maintaining the metadata driven framework engine; and updating the metadata driven framework engine upon receiving an updated configuration file by repeating the operations for the performing at least one different action in maintaining the metadata driven framework engine.

2. The method of claim 1, further comprising:

tracking at least one action that corresponds to the database activity;

logging at least one change that is associated with each of the at least one action; and automatically generating at least one report for the at least one application, the at least one report including information that relates to at least one from among the database activity, the at least one action, the at least one change, and an activity completion status.

3. The method of claim 1, further comprising:

automatically determining another condition of the database based on the result of the monitoring, the other condition including a change condition; and generating at least one notification for a user associated with the at least one application, the at least one notification including information that relates to at least one from among the at least one health characteristic, the database, the database activity, the error condition, and the change condition.

4. The method of claim 3, further comprising:

automatically determining at least one resolution action for the database activity when the error condition is determined;

identifying a database activity schedule for the database, the database activity schedule relating to an initiation of at least one subsequent database activity; and automatically scheduling execution of the at least one resolution action based on the database activity schedule and the configured at least one parameter.

5. The method of claim 3, wherein the generating the report further comprises:

aggregating, when the error condition is determined, data that corresponds to the error condition and the database activity;

automatically generating a ticket in a workflow management system by using the aggregated data; and alerting the user that is associated with the at least one application, the alert including information that relates to at least one from among the error condition, the database activity, and the generated ticket.

6. The method of claim 1, wherein the error condition relates to an index state of the database, wherein the index state comprises at least one from among an invalid state and an invisible state, and wherein the error condition includes at least one from among a failed condition that relates to a malfunction in a maintenance task and an uncompleted condition that relates to an incompletion of the maintenance task due to an insufficient time window.

7. The method of claim 1, wherein the configuration file includes at least one instruction and a corresponding time window for the database activity, the database activity including the at least one maintenance activity for at least one database object that is associated with the at least one application.

8. The method of claim 1, further comprising:

receiving at least one new constraint that governs the database activity for the at least one application; and automatically updating the configured at least one parameter of the database based on the at least one new constraint.

9. The method of claim 1, wherein the at least one database procedure includes at least one persistent section that corresponds to each of the configured at least one parameter.

10. A computing device configured to implement an execution of a method for providing database management as a service, the computing device comprising:

a processor;

a memory; and a communication interface coupled to each of the processor and the memory, wherein the processor is configured to:

implement a metadata driven framework engine to perform operations comprising:

onboard at least one application to access a corresponding configuration file and a metadata table;

parse the configuration file to identify at least one constraint that governs a database activity for the at least one application and a database that corresponds to the at least one application;

identify at least one database procedure based on the at least one constraint;

configure at least one parameter of the database based on the at least one constraint, the at least one parameter defining at least one property of the database activity;

automatically initiate, by using the identified at least one database procedure, a direct control of the database activity for the at least one application based on the configured at least one parameter;

monitor at least one health characteristic of the database when the database activity is automatically initiated;

automatically determine a condition of the database based on a result of the monitoring, the condition including an error condition comprising an identification of an obsolete data object in the database;

minimize a production failure and a risk associated with a missing service level agreement by performing at least one different action at an optimal time window to perform at least one maintenance activity on the metadata driven framework engine, wherein the performing at least one different action is associated with the database activity that corresponds to the at least one maintenance activity and includes the performing at least one different action on same database objects based on a usage of a database object at different time periods;

generate a report comprising at least one from among an audit and a log table recording a status of the performing at least one different action in maintaining the metadata driven framework engine; and update the metadata driven framework engine upon receiving an updated configuration file by repeating the operations for the performing at least one different action in maintaining the metadata driven framework engine.

11. The computing device of claim 10, wherein the processor is further configured to:

track at least one action that corresponds to the database activity;

log at least one change that is associated with each of the at least one action; and automatically generate at least one report for the at least one application, the at least one report including information that relates to at least one from among the database activity, the at least one action, the at least one change, and an activity completion status.

12. The computing device of claim 10, wherein the processor is further configured to:

automatically determine another condition of the database based on the result of the monitoring, the other condition including a change condition; and generate at least one notification for a user associated with the at least one application, the at least one notification including information that relates to at least one from among the at least one health characteristic, the database, the database activity, the error condition, and the change condition.

13. The computing device of claim 12, wherein the processor is further configured to:

automatically determine at least one resolution action for the database activity when the error condition is determined;

identify a database activity schedule for the database, the database activity schedule relating to an initiation of at least one subsequent database activity; and automatically schedule execution of the at least one resolution action based on the database activity schedule and the configured at least one parameter.

14. The computing device of claim 12, wherein the processor is further configured to generate the report by:

aggregating, when the error condition is determined, data that corresponds to the error condition and the database activity;

automatically generating a ticket in a workflow management system by using the aggregated data; and alerting the user that is associated with the at least one application, the alert including information that relates to at least one from among the error condition, the database activity, and the generated ticket.

15. The computing device of claim 10, wherein the error condition relates to an index state of the database, wherein the index state comprises at least one from among an invalid state and an invisible state, and wherein the error condition includes at least one from among a failed condition that relates to a malfunction in a maintenance task and an uncompleted condition that relates to an incompletion of the maintenance task due to an insufficient time window.

16. The computing device of claim 10, wherein the configuration file includes at least one instruction and a corresponding time window for the database activity, the database activity including the at least one maintenance activity for at least one database object that is associated with the at least one application.

17. The computing device of claim 10, wherein the processor is further configured to:

receive at least one new constraint that governs the database activity for the at least one application; and automatically update the configured at least one parameter of the database based on the at least one new constraint.

18. The computing device of claim 10, wherein the at least one database procedure includes at least one persistent section that corresponds to each of the configured at least one parameter.

19. A non-transitory computer readable storage medium storing instructions for providing database management as a service, the storage medium comprising executable code which, when executed by a processor, causes the processor to:

implement a metadata driven framework engine to perform operations comprising:

onboard at least one application to access a corresponding configuration file and a metadata table;

parse the configuration file to identify at least one constraint that governs a database activity for the at least one application and a database that corresponds to the at least one application;

identify at least one database procedure based on the at least one constraint;

configure at least one parameter of the database based on the at least one constraint, the at least one parameter defining at least one property of the database activity;

automatically initiate, by using the identified at least one database procedure, a direct control of the database activity for the at least one application based on the configured at least one parameter;

monitor at least one health characteristic of the database when the database activity is automatically initiated;

automatically determine a condition of the database based on a result of the monitoring, the condition including an error condition comprising an identification of an obsolete data object in the database;

minimize a production failure and a risk associated with a missing service level agreement by performing at least one different action at an optimal time window to perform at least one maintenance activity on the metadata driven framework engine, wherein the performing at least one different action is associated with the database activity that corresponds to the at least one maintenance activity and includes the performing at least one different action on same database objects based on a usage of a database object at different time periods;

generate a report comprising at least one from among an audit and a log table recording a status of the performing at least one different action in maintaining the metadata driven framework engine; and update the metadata driven framework engine upon receiving an updated configuration file by repeating the operations for the performing at least one different action in maintaining the metadata driven framework engine.

20. The storage medium of claim 19, wherein, when executed by the processor, the executable code further causes the processor to:

track at least one action that corresponds to the database activity;

log at least one change that is associated with each of the at least one action; and automatically generate at least one report for the at least one application, the at least one report including information that relates to at least one from among the database activity, the at least one action, the at least one change, and an activity completion status.

\* \* \* \* \*